Sept. 13, 1966  F. C. KELLY  3,272,317
CONVEYORS
Filed June 25, 1964  2 Sheets-Sheet 1
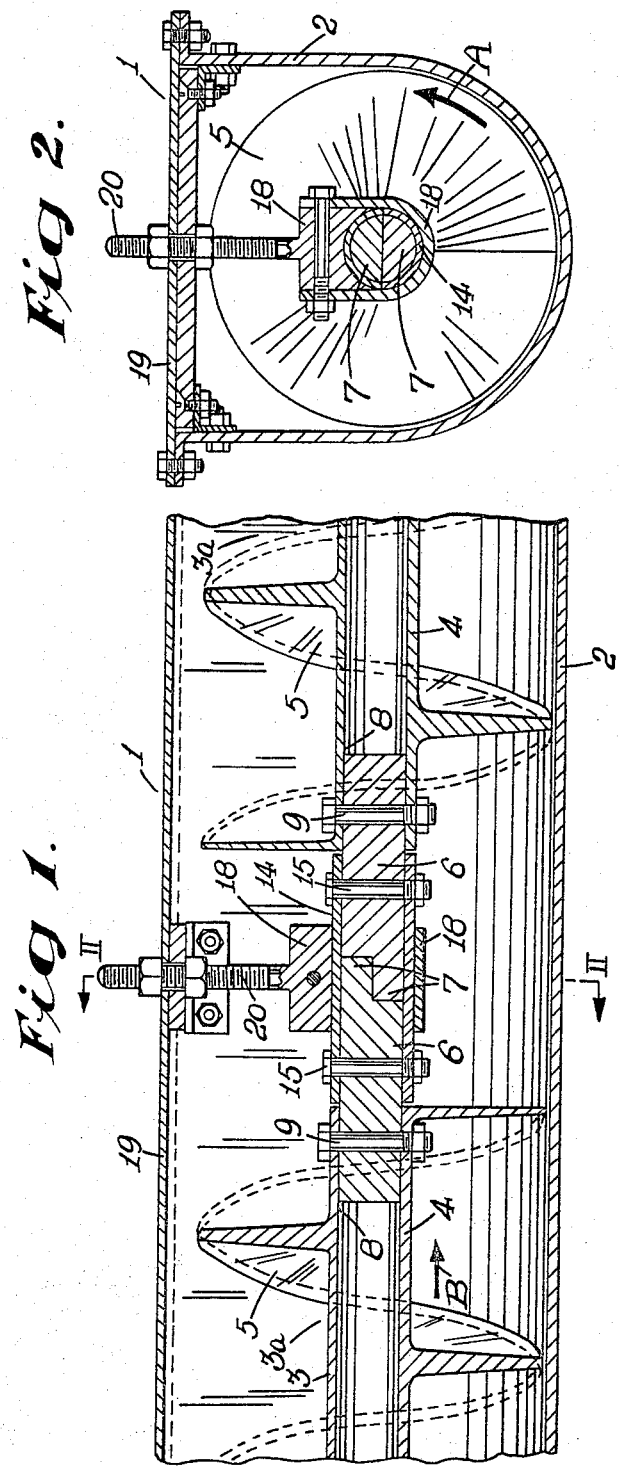

Sept. 13, 1966  F. C. KELLY  3,272,317
CONVEYORS
Filed June 25, 1964  2 Sheets-Sheet 2
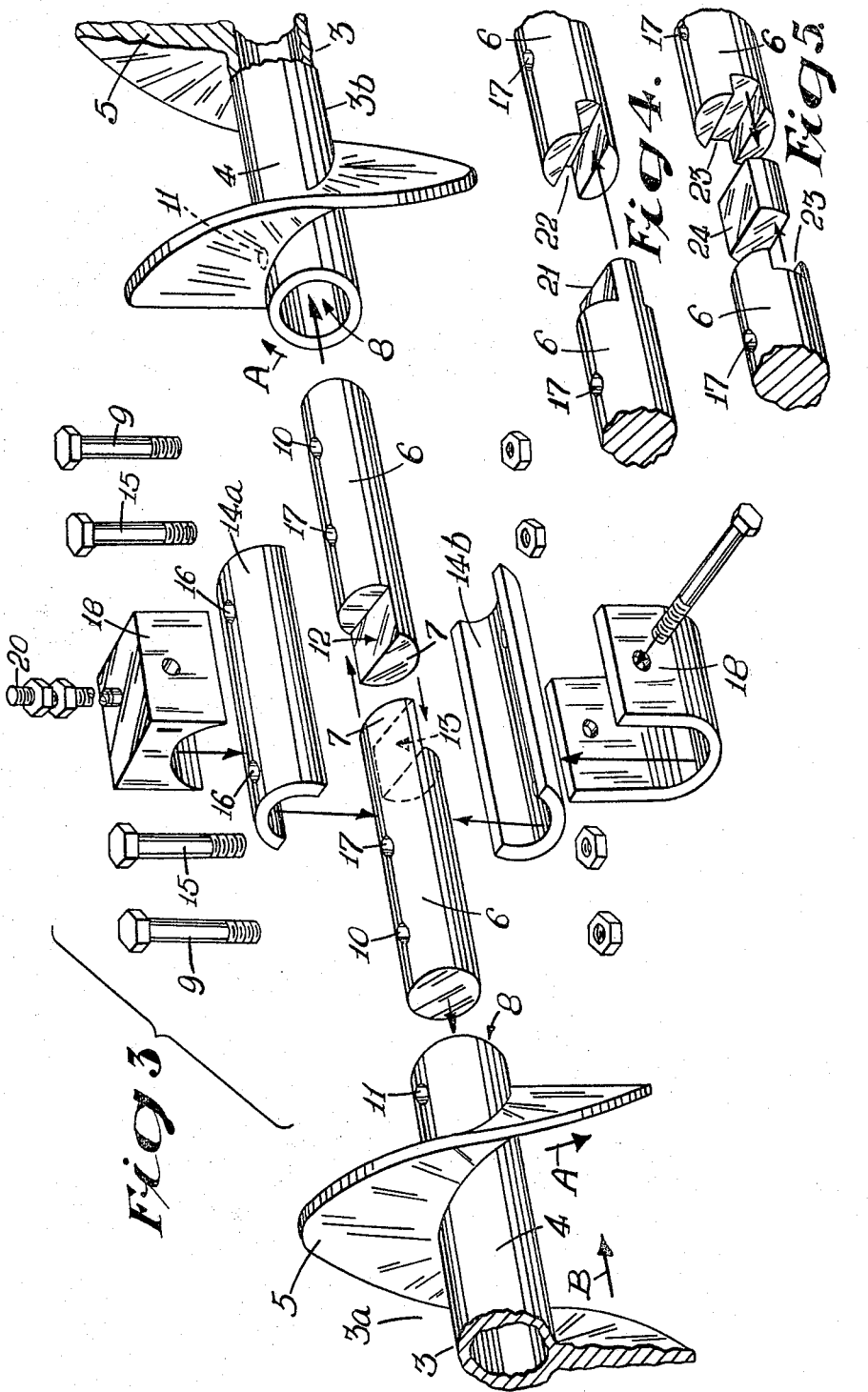

United States Patent Office 3,272,317
Patented Sept. 13, 1966

3,272,317
CONVEYORS
Frederick Christopher Kelly, Kensington, Johannesburg, Transvaal, Republic of South Africa, assignor to Fred Kelly & Sons (Proprietary) Limited
Filed June 25, 1964, Ser. No. 378,019
Claims priority, application Republic of South Africa, July 10, 1963, 63/3,097
5 Claims. (Cl. 198—213)

This invention relates to screw conveyors.

Several arrangements for connecting conveyor screw members, coaxially in end to end relationship, are known. Thus in one known arrangement, a gudgeon pin is used to connect adjacent members, the pin being located in sockets provided in the end zones of the shafts of the screw members. In this arrangement, if a screw member in a series is damaged, it is necessary to remove all the members from one end before access to the damaged one can be attained.

In an alternative arrangement a dog is employed to connect two flanged pins, one in each socket, so that the removal of a single screw member in a series laterally or transversely with respect to the axis of the conveyor is possible. In this case, however, expensive machining processes in the manufacture of the pins and dog are involved. Furthermore, where hanger bearings are provided for rotatably supporting the screw members, the pins or the dog provide bearing surfaces for engagement with the hangers and these relatively expensive members are consequently subject to wear.

In yet another arrangement connecting elements in the form of pins are provided for anchorage one in each socket of adjacent screw members and a centre piece is interposed between the adjacent ends of these pins. A keying slot is provided in the end of each pin and in each end of the centre piece abutting the pin ends to provide for a pair of key members which ensure a driving connection between the pins. The keys are held in position by removable, plural part collars and a hanger bearing engages the centre piece between these collars. Whilst this arrangement is generally satisfactory, since it permits a lateral removal of a screw member and a hanger bearing which need not be of the normal split kind, it is nevertheless relatively expensive due to the large amount of machining required to form a centre piece having two keying slots. Furthermore it is this relatively expensive centre piece which is subjected to wearing engagement with the support bearing and consequently maintenance of the coupling is high.

It is an object of the invention to provide a coupling which can be relatively cheaply manufactured and which will permit the removal of a damaged screw member without disturbing adjacent screw members.

It is a further object of the invention to provide a coupling in which the major wear will be on parts which are easy and inexpensive to replace.

According to the invention a coupling for connecting conveyor screw members having tubular shaft ends, for the formation of a screw conveyor, includes a first connecting element adapted to be anchored to a screw member in a tubular end thereof with part of the element projecting from the tubular end; a second connecting element adapted to be anchored to an adjacent screw member in similar fashion; torque transmitting formations associated with the ends of the projecting parts of the elements for effecting a driving connection between the elements, said formations being laterally separable to permit lateral removal of a screw member from the conveyor without axial movement of an adjacent screw member; and a retaining sleeve embracing the formations and holding them against lateral separation, the sleeve providing a bearing surface for engagement with a support bearing and comprising at least two parts anchored for rotation with the elements, the sleeve parts being releasable to permit removal of the sleeve and subsequent lateral separation of the formations.

Further aspects of the invention will become apparent from the following description with reference to the accompanying drawings, in which:

FIGURE 1 is a longitudinal section through part of a conveyor showing the adjacent ends of two conveyor screw members connected by one form of coupling according to the invention;

FIGURE 2 is a cross-section taken on the line II—II in FIGURE 1;

FIGURE 3 is an exploded perspective view of the conveyor screw members and coupling means illustrated in FIGURE 1;

FIGURE 4 is a perspective view of an alternative form of coupling according to the invention; and FIGURE 5 is a perspective view of a further alternative form of coupling means according to the invention.

Referring now to FIGURES 1 to 3 of the drawings, the screw conveyor 1 includes a trough 2 of any desired length and in which material is to be moved.

Accommodated in the trough 2, in line along its length, is a series of connected conveyor screw members 3 of any suitable kind, for example of the helicoidal, sectional or ribbon flight type. Each screw member 3 comprises a tubular core or shaft 4 provided with flights 5. In the drawing only two conveyor screws, of which parts are broken away, are shown, screw 3a leading screw 3b in the line.

Rotation of the conveyor screws is effected by a prime mover (not shown) located at one end of the line. The prime mover drives an end screw member in the direction of arrow A so that material is moved in the direction of arrow B, torque being transmitted from the driven screw to each succeeding screw in the line through the coupling of the invention as will be described hereunder.

As can be clearly seen in FIGURE 1, the conveyor screws are disposed coaxially with their ends slightly spaced apart. The connection is made between the screws 3 by connecting elements in the form of pins 6 which have, at their ends projecting from the shafts 4, torque transmitting formations in the form of complemental steps 7. A pin 6 is inserted in the bore 8 of the tubular shaft 4 of each screw and anchored in position by a bolt 9 passed through mating holes 10 and 11 in the pin 6 and shaft 4 respectively. The steps 7 are brought into engagement with one another by maneuvring the screw members 3 so that the steps 7 abut along surfaces 12 and 13. Since these surfaces are transverse a plane normal to the screw axes, i.e. parallel to the screw axes in this case, they constitute torque transmitting surfaces so that rotation is transmitted from one screw member to another through the steps 7 of the pins 6, the steps 7 being laterally engageable and separable.

In order to hold the steps 7 against lateral separation a retaining sleeve 14 is provided for the steps, the sleeve being located entirely in the space between the ends of the shafts 4 and having an outside diameter equal to that of the shafts 4. The sleeve 14 includes a pair of semi-circular sleeve sections 14a and 14b which are secured to the pins 6 by bolts 15 passed through mating holes 16 and 17 in the sleeve sections and pins respectively, the sleeve thus holding surfaces 12 and 13 in abutment and ensuring the transmission of torque from one screw to another.

The conveyor screws 3 are suspended in the trough 2 by means of hanger bearings 18 which latter are in turn suspended from a cover 19 for the trough by means of bolts 20. As is clear from the drawings, the hanger bearings engage sleeves 14 of the coupling of the invention so that these sleeves not only act to retain the pin torque transmitting formations or steps 7 in engagement but also constitute wearing linings for the connecting elements or pins 6.

It will be appreciated that in the above arrangement a damaged conveyor screw 3 can be removed for repair or replacement simply by removing the hanger bearings 18 at each end, and the bolts 15 securing the sleeves 14 and sliding the damaged screw member laterally from the line. Thus it will not be necessary to dismantle several screws in the assembly to gain access to the damaged member. Furthermore, by the use of complementary torque transmitting formations on the connecting elements and a retaining sleeve for holding the formations in engagement, expensive machining processes presently employed to produce flanged pins and other types of connecting elements can be greatly reduced.

In addition the retaining sleeve engages the hanger bearing and acts as a wearing lining as stated above. The sleeve is relatively inexpensive and is easily replaceable and is effective in substantially reducing wear on the more expensive connecting elements.

FIGURE 4 illustrates an alternative coupling according to the invention. In this case the coupling is identical to that described above with reference to FIGURES 1 to 3 except that the connecting elements or pins 6 have interengaging tongue and groove torque transmitting formations 21 and 22 respectively in place of the complementary steps of the previous arrangement. Clearly in both the stepped and tongue and groove arrangements a direct engagement occurs between the end formations.

In figure 5 a further alternative arrangement is illustrated and in this case the torque transmitting formations are grooves 23 provided in both pins 6. Part of the formations in this case is a key 24.

If desired, the torque transmitting formations could simply comprise flat complementary surfaces on the pins 6 which are transverse to a plane normal to the conveyor screw axes, i.e. the abutting ends of the pins could be chamfered.

I claim:
1. A coupling for connecting conveyor screw members having tubular shaft ends, for the formation of a screw conveyor, including a first connecting element adapted to be anchored to a screw member in a tubular end thereof with part of the element projecting from the tubular end; a second connecting element adapted to be anchored to an adjacent screw member in similar fashion; torque transmitting formations associated with the ends of the projecting parts of the elements for effecting a driving connection directly between the elements, the torque transmitting formation of one of said elements having a surface closely engaging in torque transmitting overlapping relationship a mating surface of the torque transmitting formation of the other of said elements, each said surface being at an angle to a plane perpendicular to the axis of said first and second elements, said formations being laterally separable to permit lateral removal of a screw member from the conveyor without axial movement of an adjacent screw member; and a retaining sleeve located in a gap between the screw members and embracing the formations and holding them against lateral separation, the sleeve providing a bearing surface for engagement with a support bearing and comprising at least two parts, each part being releasably anchored to each of the connecting elements at positions located between said formations and the other ends of said projecting parts for rotation therewith, and means for anchoring said sleeve parts to said connecting elements, the sleeve parts being releasable to permit removal of the sleeve and subsequent lateral separation of the formations, said support bearing engaging the sleeve between said means.

2. A coupling as claimed in claim 1 in which the torque transmitting formations comprise complementary steps on the connecting elements, said torque transmitting surfaces being opposed surfaces on said steps.

3. A coupling as claimed in claim 1 in which the torque transmitting formations comprise a tongue on one element and a mating groove in the other element, said torque transmitting surfaces being opposed surfaces on said tongue and groove.

4. A coupling as claimed in claim 1 in which the torque transmitting formations comprise grooves in the elements and a key engaging in the grooves, said torque transmitting surfaces being opposed surfaces on said grooves and key.

5. A coupling as claimed in claim 1 in which the outside diameter of the sleeve is equal to the outside diameter of the shafts of the conveyor screw members.

References Cited by the Examiner

UNITED STATES PATENTS

| 275,877 | 4/1883 | Barns | 287—104 |
| 500,153 | 6/1893 | Parman | 287—104 |
| 1,158,844 | 11/1915 | Price | 287—2 |
| 1,183,681 | 5/1916 | Schipper | 287—2 X |

EVON C. BLUNK, *Primary Examiner.*

RICHARD E. AEGERTER, *Examiner.*